United States Patent [19]

Buckwitz et al.

[11] Patent Number: 4,727,637

[45] Date of Patent: Mar. 1, 1988

[54] COMPUTER AIDED CONNECTOR ASSEMBLY METHOD AND APPARATUS

[75] Inventors: Richard J. Buckwitz, Issaquah; Leslie A. Anderson, Bothell; Hugh R. Schlosstein, Renton; Alfred E. Walter, Jr., Everett, all of Wash.

[73] Assignee: The Boeing Company, Seattle, Wash.

[21] Appl. No.: 5,242

[22] Filed: Jan. 20, 1987

[51] Int. Cl.[4] ...................... B23Q 17/00; B23Q 15/00; B23P 21/00

[52] U.S. Cl. ........................................ 29/407; 29/703; 29/721; 29/739; 29/833

[58] Field of Search ................. 29/407, 428, 703, 720, 29/721, 739, 740, 741, 747, 755, 833, 834, 835, 837, 842; 250/227; 312/223; 324/66

[56] References Cited

U.S. PATENT DOCUMENTS

| | | | |
|---|---|---|---|
| 3,611,544 | 10/1971 | Frels et al. | 29/721 X |
| 3,667,104 | 6/1972 | Chamillard et al. | 29/721 X |
| 3,706,134 | 12/1972 | Sweeney et al. | 29/720 X |
| 3,731,363 | 5/1973 | Hall et al. | 29/721 |
| 3,863,319 | 2/1975 | Pellet | 29/720 X |
| 3,932,931 | 1/1976 | Wright | 29/720 X |
| 4,127,936 | 12/1978 | Schlup et al. | 29/721 |
| 4,190,890 | 2/1980 | Marx | 29/720 X |
| 4,462,155 | 7/1984 | Brunelle et al. | 29/720 X |

FOREIGN PATENT DOCUMENTS

| | | | |
|---|---|---|---|
| 54-134382 | 10/1979 | Japan | 29/833 |
| 589998 | 7/1977 | Switzerland | 29/833 |
| 609514 | 2/1979 | Switzerland | 29/833 |
| 1224389 | 3/1971 | United Kingdom | 29/833 |

*Primary Examiner*—Howard N. Goldberg
*Assistant Examiner*—Ronald S. Wallace
*Attorney, Agent, or Firm*—Dellett, Smith-Hill and Bedell

[57] ABSTRACT

A contact which is attached to a wire is fitted in a hole of a connector by first identifying the wire to which the contact is attached. The location of the hole that is to receive the contact is determined automatically from an electronic data lookup table, and a signal is provided which positions an end portion of a fiber optic rod in line with the correct hole of the connector. The opposite end of the fiber optic rod is optically coupled to a source of light. The fiber optic rod is advanced so that it enters the hole and projects from the opposite side of the connector identifying the correct hole. Light emitted from the fiber optic rod facilitates visual identification of the hole from which the rod is projecting. Thereafter, the fiber optic rod is retracted, and the contact is inserted into the hole.

18 Claims, 28 Drawing Figures

COMPUTER AIDED CONNECTOR ASSEMBLY METHOD AND APPARATUS

This invention relates to a method and apparatus for computer aided connector assembly.

BACKGROUND OF THE INVENTION

Conventional connection apparatus, e.g., for connecting two bundles of wires together or for connecting a bundle of wires to an instrument, control means, etc., comprises two connectors to which conductors are respectively assembled. When the connectors are brought into mating relationship, the conductors of one bundle are brought into electrically conductive relationship with respective conductors of the remaining bundle, instrument or the like.

It is conventional for each connector to comprise a mating shell (suitably cylindrical in shape), which is mechanically connected to the shell of the other connector when the two connectors are brought into operative relationship, plus a contact receiving insert. The insert is made of dielectric material and is in the form of a plate having an inner surface which confronts the corresponding insert of the other connector, and an opposite, outer surface which is parallel to the inner surface. Numerous holes penetrate this member, opening at their opposite ends at the inner and outer surfaces respectively of the insert.

A wire is prepared for attachment to the connector by stripping the dielectric sleeve from the end of the wire so as to expose the conductive core, and crimping a contact onto the conductor. This contact may be in the form of a pin or a receptacle. The contact is introduced into a hole in the aforementioned insert by way of the outer surface thereof and, in the case of a pin, projects beyond the inner surface of the insert. When all the wires have been attached to respective connectors and the connectors are brought into mating relationship, the contacts that are received in the holes of one insert are physically engaged by the contacts that are received in the holes of the other insert. Thus, the connectors typically do not have pins or receptacles other than those that are physically attached to the wires before introduction into the holes of the insulating insert.

When attaching a bundle or breakout of wires from a wiring harness to a connector, it is necessary to insure that the contacts are located in the proper holes of the insert, since otherwise the proper circuits will not be completed when the connector is coupled to its mating connector. One method of insuring that the contacts are positioned in the proper holes involves the use of a plug map. Each hole in the insert is numbered and each wire carries at its end a label or tag which bears an identifying number for the wire. (It will be understood that the term "number," when used to identify a hole or a wire, is not restricted to a numerical designation but may also include letter designations and mixed alphanumeric designations. The "number" may be encoded, e.g. on a bar code label.) The plug map correlates the wire numbers with the hole numbers. The user selects a wire for attachment to the connector, reads the wire number, consults the plug map to find the number of the hole associated with the selected wire, scans the plug to locate that hole, and inserts the contact of the selected wire into the hole. Generally, the wires are selected at random from the bundle that is to be assembled to the connector. Therefore, use of a plug map is subject to a disadvantage in that it involves carrying out a random search of the plug map for the wire number and then searching the connector itself to find the corresponding hole. Consequently, attaching the wires to the connector using a plug map in this manner is time consuming, and is subject to error, in that each wire number may have six or more characters, and it is therefore easy to confuse the wire numbers on the plug map. Moreover, even when the hole number has been found on the plug map, the density of holes on the connector itself might be such that it is easy to confuse one hole or aperture location for another.

In an automated robotic connector assembly machine, the operations of wire stripping, contact crimping and insertion are performed fully automatically. However, the wires must first be dressed into predetermined locations in a fixture. Therefore, this technique incurs a high cost while still involving manual labor.

In a cable scan system, the operator touches the contact of a selected wire to an electrode which receives a signal over the conductor of the wire. This signal represents the wire number in encoded form, and is decoded and applied to an electronic lookup table. The lookup table contains the plug map and provides the operator with the hole number without its being necessary for the operator to scan a plug map. However, this system is only applicable when the opposite end of the selected wire is connected to a signal source, i.e., has already been attached to its own connector, and does not relieve the operator of the burden of searching the insert plate for the hole having the number provided by the lookup table.

Several methods have been proposed for assisting in identifying the correct hole for receiving a particular pin. U.S. Pat. No. 3,706,134 (Sweeney et al) addresses the problem of locating the correct hole number, particularly when the density of holes is high and the numbers imprinted on the connector are small. The connector is fitted over an array of optical fibers such that the fibers are positioned beneath respective holes. An input panel constitutes an enlarged replica of the outer surface of the connector, and is formed with an aperture for each hole in the connector block. The optical fibers couple the apertures in the panel with the corresponding holes in the connector. Therefore, when a light source is placed in an aperture of the panel, light is emitted from the corresponding hole in the connector. The operator is then able to identify the holes by reference to the much larger panel, which facilitates correct identification of the holes. However, this does not relate to the difficulty associated with searching a plug map, and moreover because connector blocks are of significant thickness and the holes are quite narrow, it can be difficult to see which hole is in fact emitting light except by peering directly down the hole.

Pat. No. 3,932,931 (Wright) discloses apparatus for inserting posts into apertures in a circuit board. The circuit board is held in a horizontal plane over a vertically-disposed anvil assembly. The circuit board is movable in horizontal directions relative to the anvil assembly. Above the circuit board and vertically aligned with the anvil assembly is a post insertion machine. In order to aid in proper positioning of the board for insertion of a post by the post insertion machine, a light source is mounted to direct a beam of light downwardly towards the anvil assembly. The anvil assembly comprises a necked housing in which an anvil finger is slidingly fitted. The finger is biased upwardly to project beyond the necked housing. When the board is properly positioned, the anvil finger enters a post receiving aperture of the circuit board. A visual indication that the circuit board is properly positioned with an aperture axially aligned with the post insertion machine and the anvil assembly is provided by reflection of light from the top surface of the anvil finger.

Other methods employing light sources for guiding placement of components are described in U.S. Pat. Nos. 3,611,544 (Frels et al), 3,731,363 (Hall et al) and 4,127,936 (Schlup et al).

SUMMARY OF THE INVENTION

In a preferred embodiment of the invention, a contact which is attached to a wire is fitted in a hole of an insulating insert plate by first identifying the wire to which the contact is attached. The location of the hole that is to receive the connector is determined automatically from an electronic data lookup table, and a signal is provided which positions an extendable guide element in line with the correct hole of the insert plate. The guide element is advanced so that it enters the hole and projects from the opposite side of the insert plate, thus identifying the correct hole. Thereafter, the guide element is retracted, and the contact is inserted into the hole.

Preferably, the guide element is an end portion of a fiber optic rod which is optically coupled to a source of light at its opposite end, so that light is emitted from the fiber optic rod by way of the end portion that is inserted in the hole of the insert plate. In this manner, visual identification of the correct hole is facilitated.

It is accordingly an object of the present invention to provide an improved method and apparatus for positioning contacts in electrical connectors.

It is another object of the present invention to provide an improved method and apparatus for guiding insertion of a contact into a hole from one surface of an insulating insert plate by positioning and introducing an element into the hole from the opposite surface of the insert plate so that it projects beyond the insert plate and can be readily seen.

BRIEF DESCRIPTION OF THE DRAWINGS

For a better understanding of the invention, and to show how the same may be carried into effect, reference will now be made, by way of example, to the accompanying drawings in which.

In the different figures, elements designated by like reference numerals have corresponding functions.

DETAILED DESCRIPTION

Figure 1:
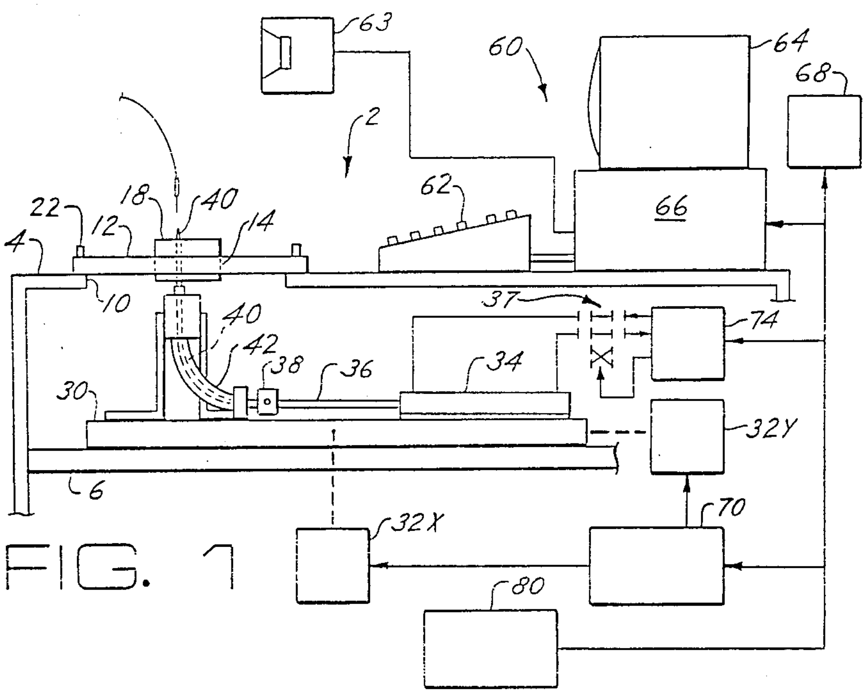
FIG. 1 is a schematic side view, partly in section, of a first computer aided connector assembly apparatus.
Figure 2A:
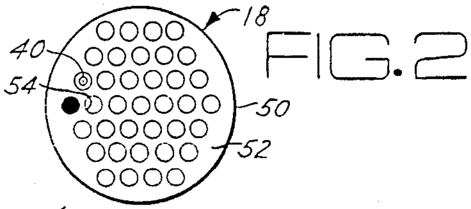
FIG. 2*a* is a plan view to an enlarged scale of a connector.
Figure 2B:
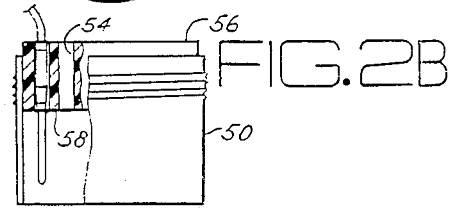
FIG. 2*b* is a partial sectional view of the connector.

The apparatus illustrated in FIG. 1 comprises a workstation 2 having a top plate 4 and a bottom plate 6. The plates 4 and 6 are maintained in spaced, parallel relationship. The top plate 4 is formed with an opening 10 over which an adaptor plate 12 extends. The adaptor plate 12 is secured to the top plate 4 by means of thumb nuts 22 and is formed with an opening 14 in which a connector 18 is received in unique orientation relative to the adaptor plate 12. For example, if the connector 18 is generally circular in cross-section and has a longitudinal keyway for engagement by a key of a complementary connector, the plate 12 might itself have a key which can enter the keyway in the connector 18 and thereby define a unique orientation for the connector and fix the connector against rotation relative to plate 12.

The lower plate 6 carries an X-Y table 30 which is displaceable on bearings (not shown) over the lower plate 6 in directions parallel to two mutually perpendicular horizontal axes by means of servomotors 32X and 32Y respectively. A double-acting pneumatic cylinder 34 is mounted on the table 30. The cylinder 30 has a piston rod 36 and is placed in an extended condition or a retracted condition in dependence on the state of a valve 37. In the extended condition, the piston rod 36 projects farther from the cylinder 34 than it does in the retracted condition. The piston rod 36 carries a light source 38 at the end that projects from the cylinder. A flexible fiber optic rod 40 is mechanically coupled at one end, hereinafter referred to as the proximal end, to the piston rod 36 in coaxial alignment therewith and is optically coupled by way of its proximal end to the light source 38. A guide sleeve 42 has one end portion which is axially aligned with the piston rod 36. The opposite end portion of the guide sleeve 42 projects vertically upwards above the table 30 towards the alignment fixture 16. The fiber optic rod extends from the piston rod 36 into the guide sleeve, and the distal end of the fiber optic rod (the opposite end from the proximal end) projects from the guide sleeve 42 when the cylinder 34 is in its extended condition, as shown in FIG. 1. When the pneumatic cylinder 34 is placed in its retracted condition, the distal end of the fiber optic rod 40 is lowered.

The connector 18 that is received in the alignment fixture 16 comprises an outer shell 50 and an insert 52. The insert is made of dielectric material and has numerous holes 54 extending therethrough. The wires that are to be attached to the connector are each stripped, and a contact is physically attached to the exposed core of the wire by crimping. The contact may be in the form of a pin or a receptacle. In attaching the wires to the connector, the contacts are introduced into the appropriate holes in the insert 52 by way of the outer surface 56 of the insert and project beyond inner surface 58, so that these contacts themselves form the contacts or terminals of the connector. In this manner, the contacts are assembled into a connector.

The connector 18 is fitted in the alignment fixture 16 with the outer surface of the insert 52 upwards, so that the inner surface 58 of the insert 52 is presented towards the lower plate 6.

The workstation also includes a computer 60 having an input device, such as a keyboard 62 and/or a voice recognition module 63 such as the Votan VTC 2000, a display device 64 and a processor 66. The processor 66, which may comprise an IBM PC/XT, communicates with a data base stored in a memory 68, an X-Y table controller 70 and a valve controller 74. The data base 68 includes an electronic lookup table which relates wire numbers with the X-Y positions of the holes in the insert, either directly or through the hole numbers.

In use of the workstation, the pneumatic cylinder 34 is initially in the retracted condition. The table 30 is positioned so that the distal end of the fiber optic rod is in a predetermined "home" position in the X and Y directions relative to the insert. This may be achieved through use of a Hall effect sensor (not shown) carried on the table 30 and a magnet (not shown) carried by the plate 12, and positioning the table so the Hall effect sensor is at a predetermined position relative to the magnet. The operator selects a wire for attachment to the connector 18 from a bundle or a part (breakout) of a bundle and enters the wire number into the computer by way of the keyboard 62 or the voice recognition module 63. The processor 66 searches the data base stored in the memory 68 and retrieves data representing the X-Y position of the hole that should receive the selected contact. This information is supplied to the X-Y table controller 70 which drives the motors 32X and 32Y to displace the table 30 so that the distal end of the fiber optic rod is located directly beneath the correct hole in the insert. The valve controller 74 then positions the valve 37 for placing the cylinder 34 in its extended condition, and the cylinder 36 advances the fiber optic rod 40 so that its distal end is pushed upwards into the correct hole of the insert and projects above the outer surface of the insert. Light emitted from the distal end of the fiber optic rod enables the operator to discern the rod easily, and identify the hole from which the distal end of the rod is projecting. Preferably, the distal end of the fiber optic rod is bevelled so that the light leaving the rod is dispersed and can be seen by the operator without having to view the rod along its axis. Having identified the hole from which the fiber optic rod is projecting, the operator then causes the valve controller to position the valve 37 so that the cylinder 34 is placed in its retracted condition, e.g. by actuating a foot control 80, and the cylinder 34 withdraws the distal end of the rod 40 through the insert. The user introduces the contact of the selected wire into the hole from which the fiber optic rod was withdrawn. This sequence of operations is repeated until all the wires have been attached to the connector.

In some cases, the number of holes in the connector is greater than the number of wires to be assembled to the connector, and it may be desirable to seal the holes that are not occupied by contacts, for example using filler rods of synthetic polymer material. In this case, before entering data relating to the identity of any of the wire ends, the operator enters a command which causes the processor to search the lookup table and identify the holes that are to receive filler rods. The processor causes the X-Y table controller to move the table 30 so as to place the distal end of the fiber rod beneath a first of these holes and then causes the distal end of the fiber optic rod to be inserted into that hole. The rod is withdrawn in response to a signal provided by the foot control and the processor causes the distal end of the fiber optic rod to be inserted into the next hole without awaiting a further command from the user. This sequence of operations continues until all the filler rods have been inserted. Generally, sealing of unused holes with filler rods takes place before contacts are inserted into the other holes.

If a cable having several distinct wires is to be attached to the connector, with the wires coded by the colors of their dielectric sleeves, the operator may be instructed as to the sequence in which the wires are to be attached to the connector, e.g. blue, then red, then yellow, then green. The cable can be given a number, and the processor can be caused to respond to that number by inserting the distal end of the fiber optic rod into the hole that should receive the contact for the blue wire. When the foot control is operated, the distal end of the rod is withdrawn and is immediately inserted into the hole that should receive the contact for the red wire. This continues, stepping through the sequence of colors, until the distal end of the rod has been inserted into and withdrawn from each of the holes that is to receive a contact of that cable. In this manner, it is not necessary for each of the wires to have its own number. Similarly, in the case of shielded cable having a ground conductor and a signal conductor, the processor can be programmed to identify the hole that is to receive the contact connected to the ground conductor before identifying the hole that is to receive the contact connected to the signal conductor.

In the case of FIGS. 3–6, the table 30 carries a support frame 100 on which the double-acting cylinder 34 is mounted in a vertical orientation. The outer end of the piston rod 36 is coupled to a toothed rack 102, which is in meshing engagement with a pinion (not shown) carried by a spindle 106. The spindle is disposed horizontally, and is mechanically coupled at one end to a crank arm 108. When the cylinder 34 is in its extended condition, the arm 108 is directed downwardly from the spindle 106, and when the cylinder is retracted the rack 102 is driven upwards and causes the spindle 106 to rotate through 180°, so that the arm 108 is then directed upwards from the spindle. The free end 110 of the arm 108 engages a slot 112 in a cam plate 114. The cam plate 114 is mounted on a carriage 116. The carriage 116 runs on vertical guide rods 118 which are supported at their opposite ends by the frame 100. The frame 100 also carries a light source 38 which is optically coupled to the proximal end of the flexible fiber optic rod 40. The proximal end of the rod 40 is also mechanically coupled to the support frame 100. The rod 40 follows a generally U-shaped path, extending downwards from the light source 38 and then upwards through a gripping sleeve 132 which is held in the carriage 116.

Above the rods 118, the support frame 100 carries a bushing 140 through which a guide sleeve 142 extends. The guide sleeve 142 is disposed coaxially with the gripping sleeve 132 and is slidable longitudinally within the bushing 140. The fiber optic rod extends upwards from the gripping sleeve 132 into the guide sleeve 142. At its lower end, the guide sleeve 142 is provided with a collar 146 which is formed with a peripheral groove 148.

The carriage 116 carries a bushing 160 in which a rod 162 is slidably fitted. The rod is disposed vertically, and at its upper end it carries a fork 164 having prongs which engage the peripheral groove 148 of the collar 146. At its lower end, the rod 162 is coupled to the lower end of a tension spring 166, the upper end of which is attached to the carriage 116.

The carriage 116 also carries a permanent magnet 180, and the support frame 100 is provided with Hall effect sensors 182 and 184 adjacent the path of movement which is followed by the magnet 180 when the carriage moves vertically along the rods 118.

In operation of the apparatus shown in FIGS. 3-6, the cylinder 34 is initially in its extended condition, so that the arm 108 is directed downwards from the spindle 106 and the carriage 116 is accordingly at the bottom of its path of movement along the rods 118. The existence of this condition is communicated to the processor by a signal provided by the Hall effect sensor 182 in response to proximity of the magnet 180. The motors 32X and 32Y drive the table 30 to bring the distal end of the fiber optic rod 40 to its "home" position. A wire is selected from the bundle that is to be assembled to the connector, and the number of the wire is entered. The location of the hole that is to receive the contact attached to the selected wire is retrieved from the data base, and the motors 32X and 32Y drive the table 30 to place the distal end of the fiber optic rod beneath the correct hole. The cylinder 34 is then placed in its retracted condition. As the rod 36 is retracted into the cylinder, the arm 108 rotates from the position shown in FIG. 4 to the position in which the arm extends upwardly from the spindle 106 (FIG. 6B) and the carriage 116 is accordingly driven upwards. As the carriage 116 is advanced, the distal end of the fiber optic rod also is raised. Due to the connection provided by the tension spring 166, the rod 162, the fork 164 and the collar 146, the guide sleeve 142 is advanced until its upper end engages the inner surface of insert. The insert serves as a positive stop with respect to upward movement of the guide sleeve 142, but engagement of the guide sleeve 142 with the insert does not prevent continued upward movement of the carriage 116 because of the spring 166 which couples the rod 162 to the carriage. Therefore, the carriage 116 continues to advance along the rods 118, and the distal end of the fiber optic rod advances within the guide sleeve and ultimately projects beyond the guide sleeve and passes through the correct hole in the insert. The existence of this condition is communicated to the processor by a signal provided by the Hall effect sensor 182 in response to proximity of the magnet 180. As before, the operator instructs the computer to withdraw the rod from the hole in the insert, to allow insertion of the contact of the selected wire, and as the carriage is lowered the fiber optic rod is first withdrawn from insert until its distal end is inside the guide sleeve, and ultimately the tension in the spring 166 is relieved sufficiently that the rod 162 also is lowered and the guide sleeve is brought out of engagement with the insert. This sequence of operations is repeated until all the holes in the insert have received filler rods or contacts.

Further details of the manner of operation of the FIGS. 3-6 apparatus are described below with reference to FIGS. 18-24.

The FIGS. 3-6 apparatus has the advantage with respect to the FIG. 1 apparatus that the distal end of the fiber optic rod is assuredly aligned with the hole in the insert when the distal end of the rod projects as far as the inner surface of the insert. In this manner, the flexible nature of the rod does not result in the distal end of the rod striking against the insert with the possible result of the rod's being damaged.

Figure 7A:
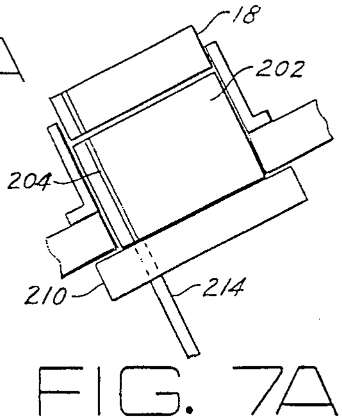
FIG. 7A is a view of an alignment block and sleeve holder.
Figure 3:
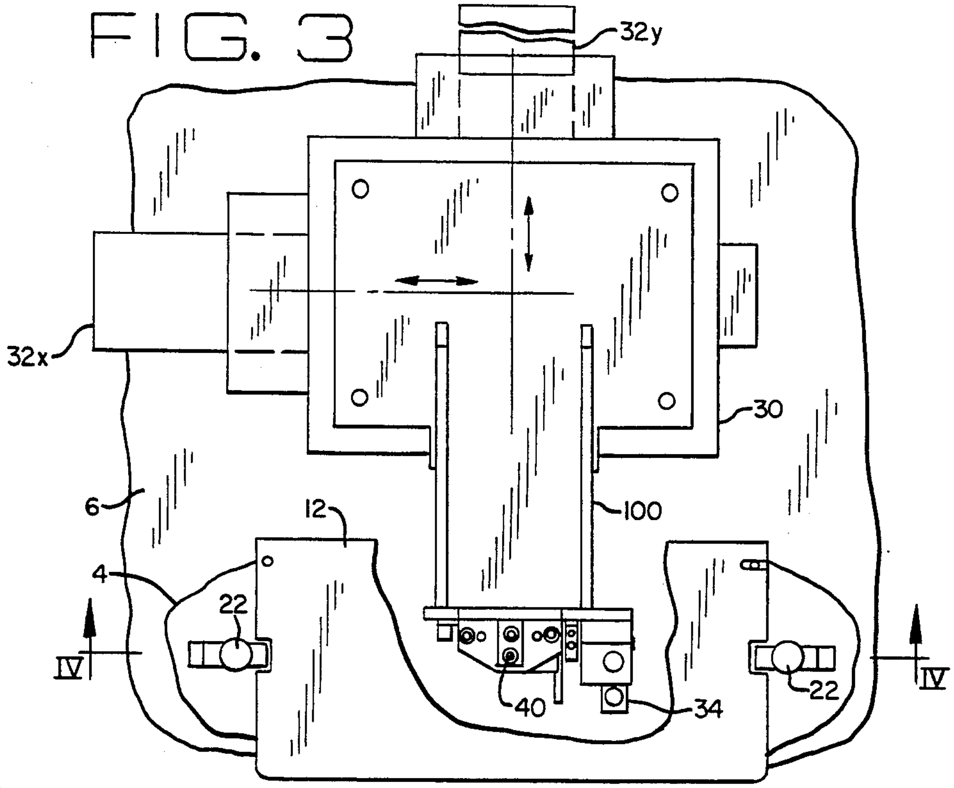
FIG. 3 is a cut away partial plan view of a portion of a second computer aided connector assembly apparatus, which operates in similar manner to the FIG. 1 apparatus.
Figure 4:
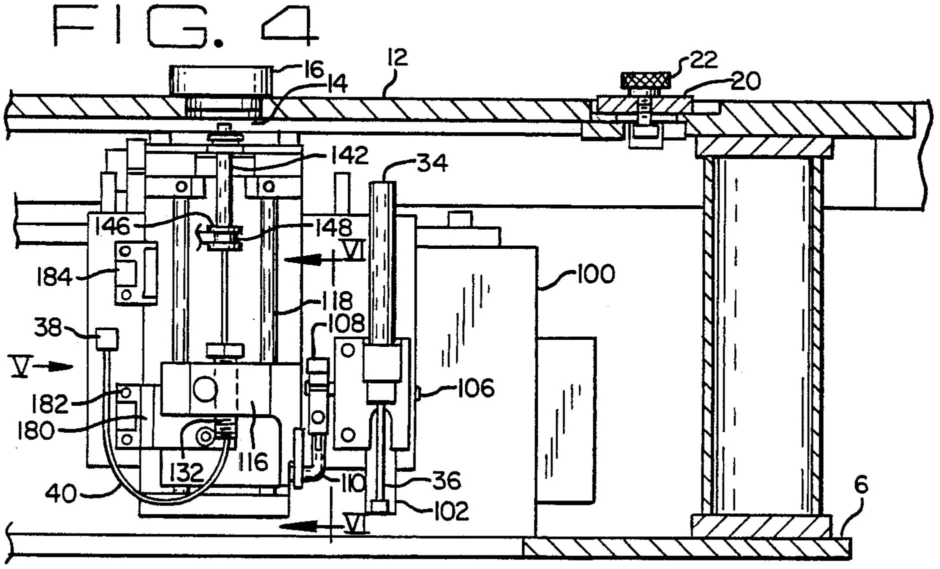
FIG. 4 is a section taken on the line IV—IV shown in FIG. 3, FIGS. 5*a* and 5*b* are views taken in the direction of the arrow V in FIG. 4 at first and second stages in operation of the FIG. 3 apparatus.
Figure 5A:
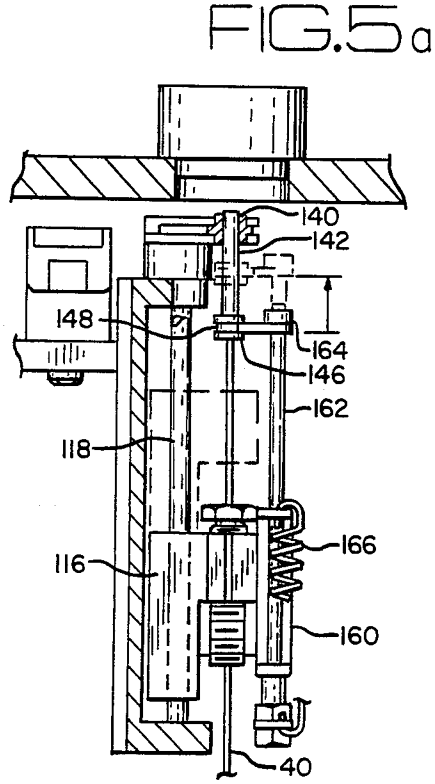
Figure 5B:
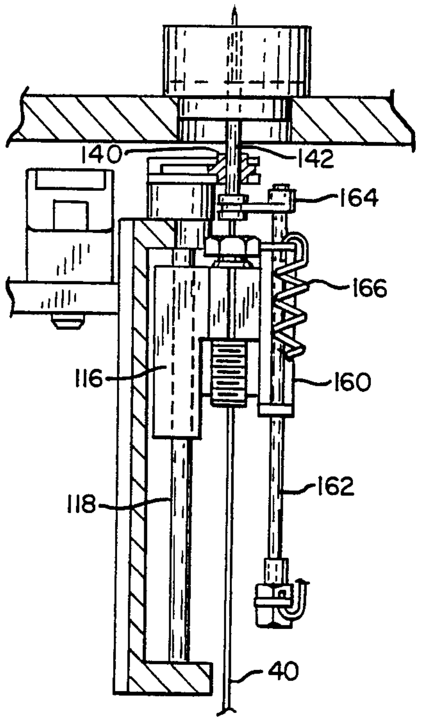
Figure 6A:
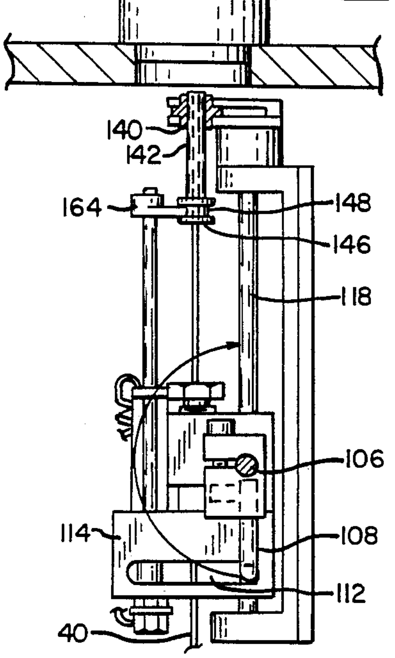
FIGS. 6*a* and 6*b* are views taken in the direction of the arrow VI in FIG. 4 at the first and second stages of operation of the FIG. 3 apparatus.
Figure 6B:
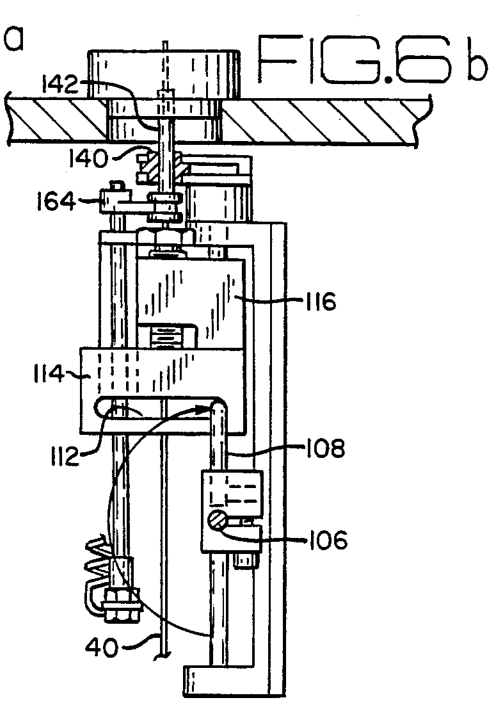
Figure 7:
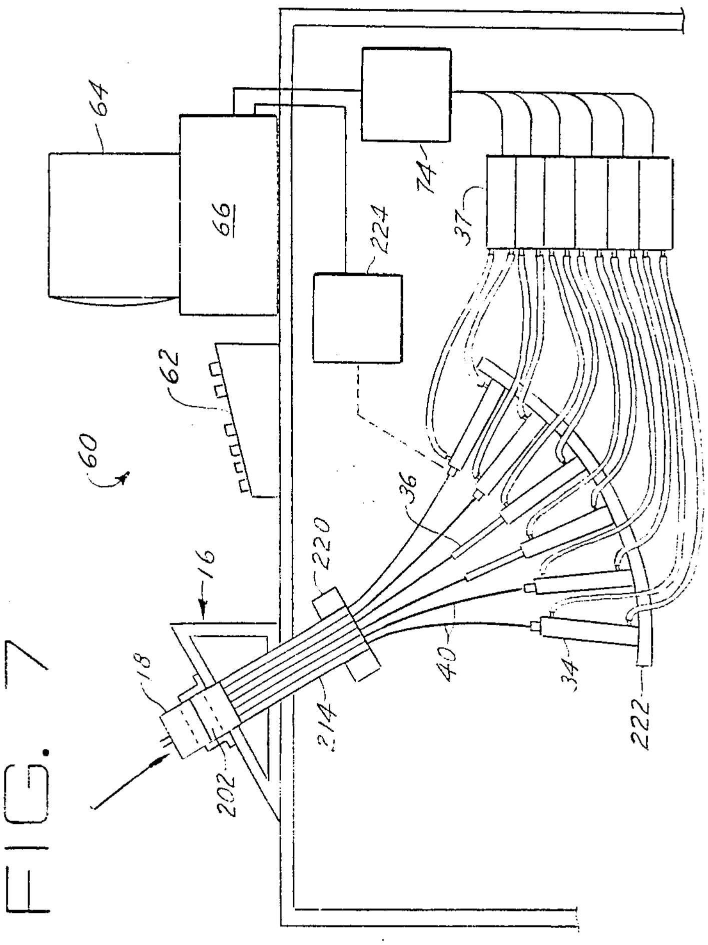
FIG. 7 is a view similar to FIG. 1 of a third computer aided connector assembly apparatus.
Figure 8:
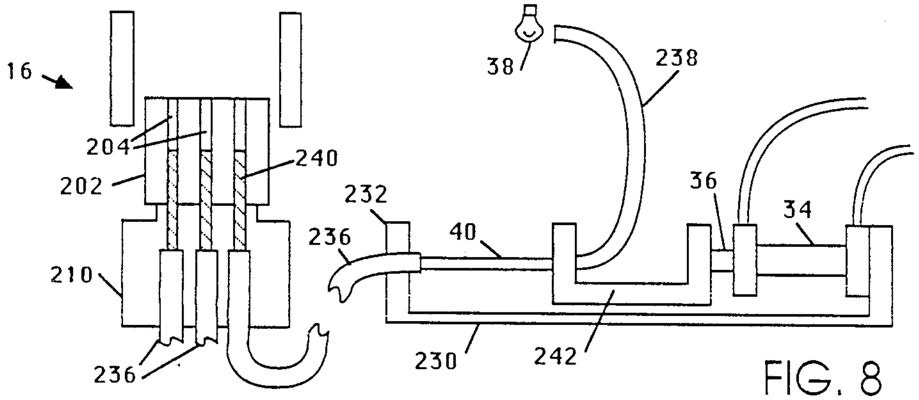
FIG. 8 is a simplified view of a portion of a fourth computer aided connection assembly apparatus, which operates in similar manner to the FIG. 7 apparatus.

In the apparatus illustrated in FIGS. 7 and 7A, the alignment fixture 16 includes an alignment block 202. The block 202 is formed with a plurality of holes 204 which are arranged identically to the holes in the insert of the connector 18. The alignment block 202 is suitably connected to a sleeve holder 210 (see FIG. 7A) which holds one end of each of a plurality of straight guide sleeves 214. The guide sleeves are in axial alignment with respective holes 204 in the alignment block 202. At their opposite ends, the guide sleeves 214 are fixed in a mounting frame 220. A holding plate 222 carries a plurality of double-acting pneumatic cylinders 34. The piston rod 36 of each cylinder is mechanically coupled in coaxial relationship to a fiber optic rod 40, and the rods 40 enter the guide sleeves 214 respectively. Each piston rod also carries a light source (not shown) which is optically coupled to the proximal end of the associated fiber optic rod. Each cylinder 34 has two ports which are connected by compressed air lines to a solenoid operated cylinder control valve 37. Each valve has a first state in which the cylinder is placed in its extended condition and a second state in which the cylinder is placed in its retracted condition. The states of the valves 37 are controlled by the valve controller 74 in response to signals provided by the processor 66. The processor 66 also provides signals to a lamp controller 224 which determines the states of the light sources. The manner of operation of the FIG. 7 apparatus is substantially the same as that of the FIGS. 8-17 apparatus, described below.

In the FIGS. 8-17 apparatus, plural pneumatic cylinders 34 are mounted in mutually parallel relationship in a mounting frame 230. The mounting frame 230 has an end plate 232 which extends perpendicularly to the axes of the cylinders and is formed with a plurality of apertures coaxial with the cylinders 34 respectively.

Flexible guide sleeves 236 each have one end received in the sleeve holder 210 and the opposite end received in an aperture of the end plate 232. Fiber optic rods 40 extend slidingly within the guide sleeves 236 respectively. The proximal end 238 of the fiber optic rod is maintained stationary and is optically coupled with a light source 38, and the distal end projects beyond the sleeve holder 210 and into the alignment block 202. Between its end 238 and the point at which it enters its guide sleeve 236, each fiber 40 is attached to one arm of a generally U-shaped member 242, the other arm of which is attached to the piston rod 36.

Figure 9:
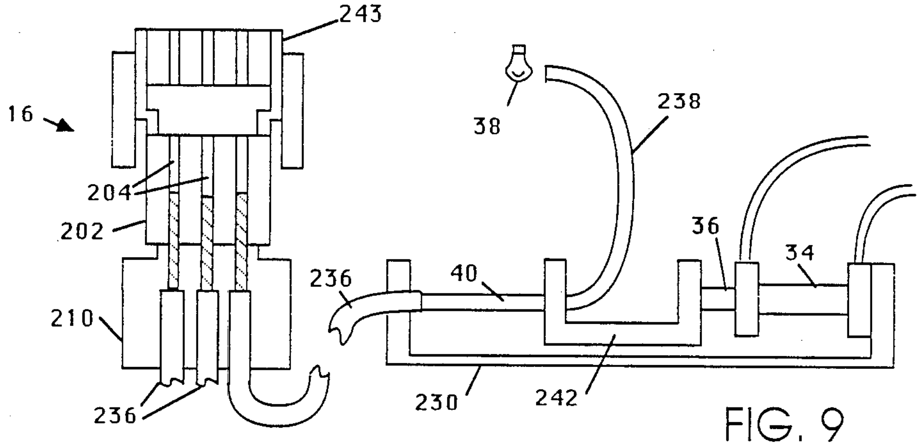
FIGS. 9–17 are views similar to FIG. 8 at subsequent stages in operation of the FIG. 8 apparatus, and FIGS. 18–24 together form a flowchart for illustrating the manner of operation of the FIGS. 2–6 apparatus.
Figure 10:
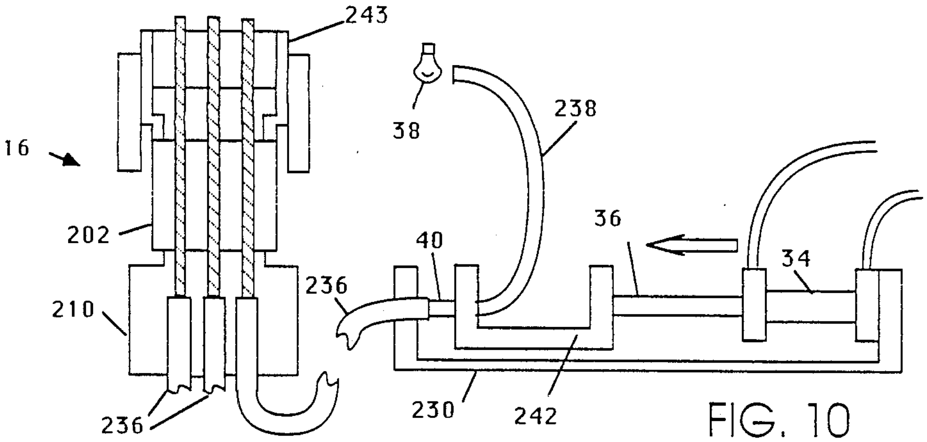
Figure 11:
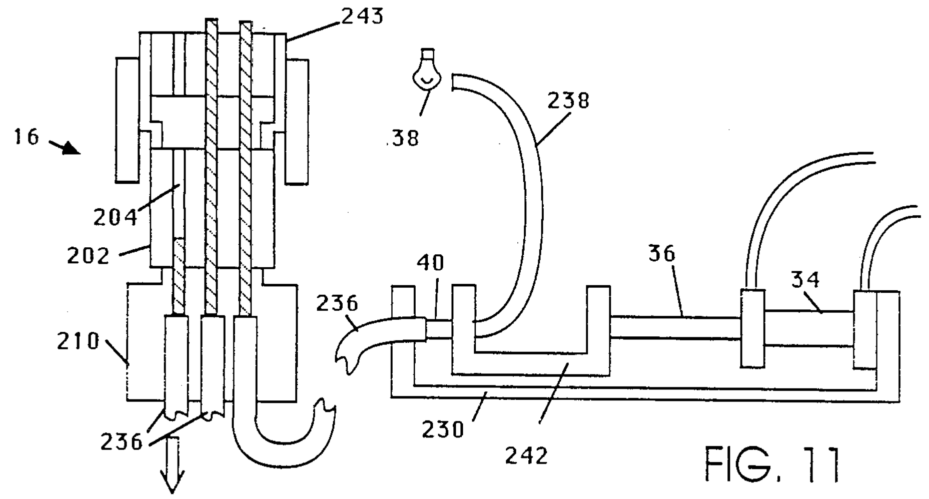
Figure 12:
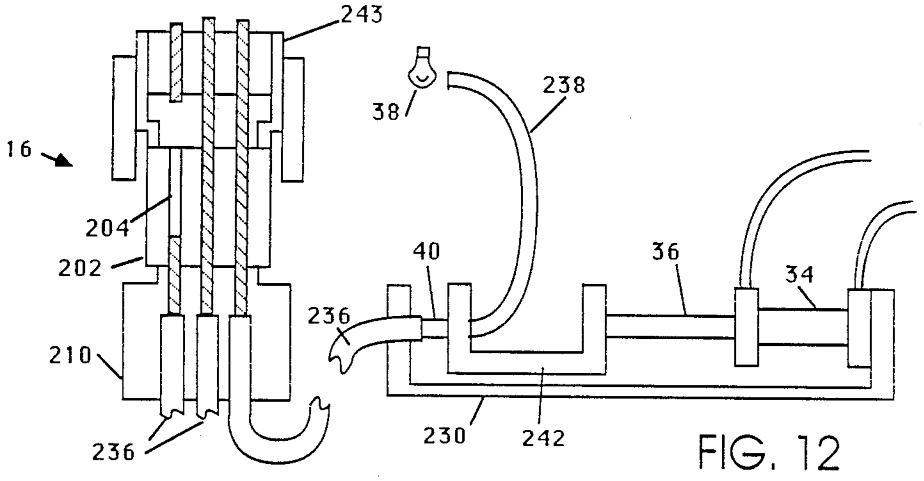

In operation of the apparatus illustrated in FIGS. 8-17, data identifying the connector is entered into the computer (not shown in FIGS. 8-17) and the connector is fitted to the alignment fixture 16. In this manner, the holes in the alignment block are aligned with the holes in the insert of the connector (FIG. 9). An instruction ADVANCE is provided to the computer, and the computer causes the valve controller to place each of the cylinder control valves 37 in the first state, in which the cylinders are in the extended condition. Each piston rod 36 therefore drives the associated U-shaped member 242 towards the end plate, and the rods 40 are advanced through the respective guide sleeves 236 so that the distal end of each rod projects into and through the corresponding hole in the insert of the connector (FIG.

Figure 13:
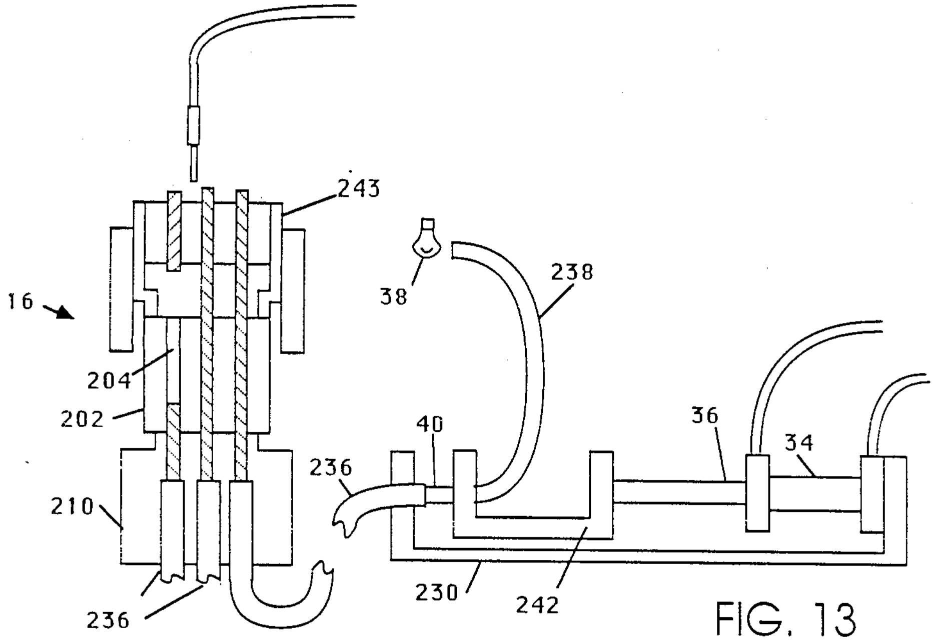
Figure 14:
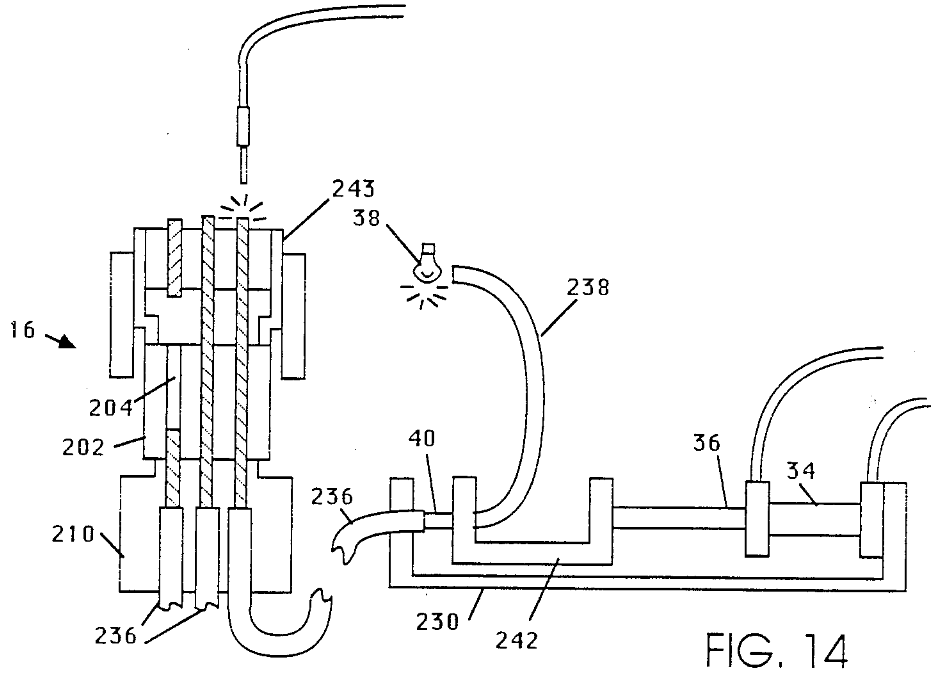
Figure 15:
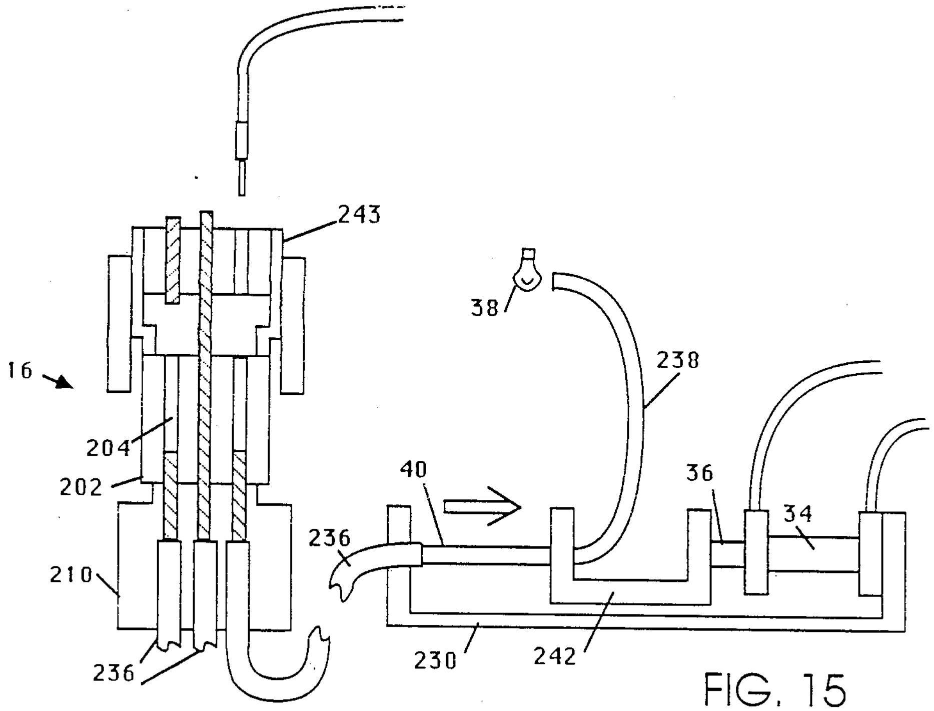
Figure 16:
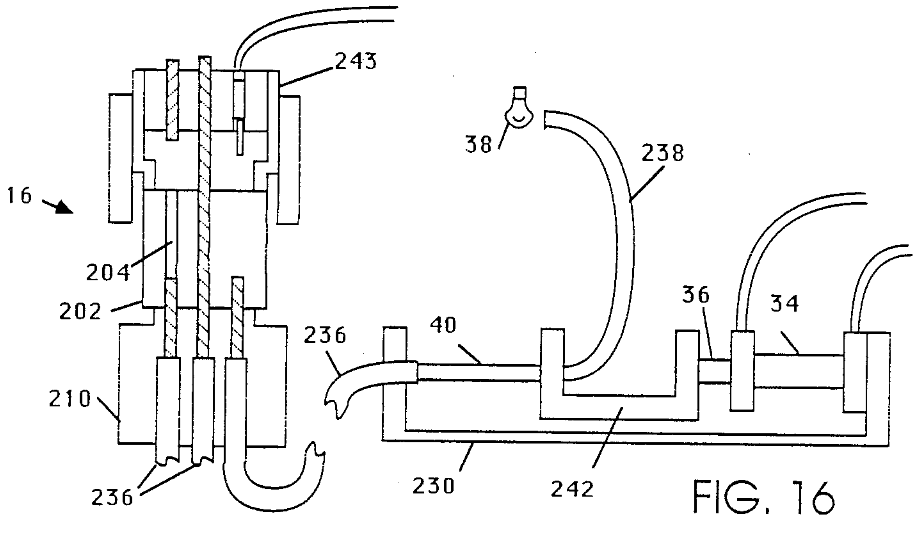
Figure 17:
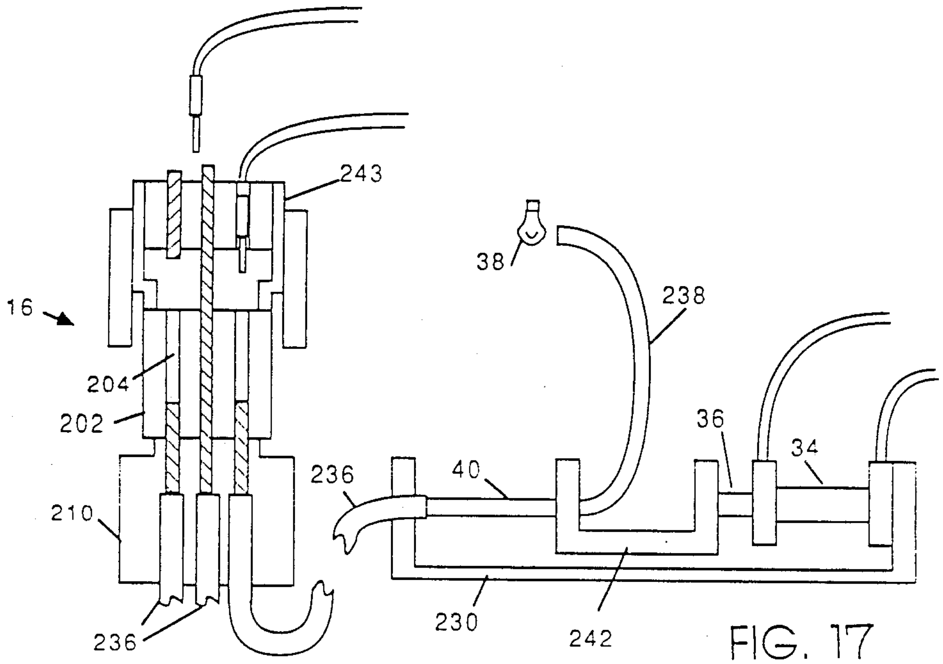

10). At this point, the command FILLER RODS is given to the computer, and the computer carries out a search through the lookup table to identify the holes in the insert that are to receive filler rods. The computer causes the valve controller to shift to the second state operating cylinder control valves which are associated with the holes that are to receive filler rods. Thus, the fiber optic rods projecting from the holes that are to receive filler rods are retracted (FIG. 11), and the operator is able to insert filler rods into those holes. When all the filler rods have been inserted (FIG. 12), the operator selects a wire from the bundle which is to be attached to the connector and enters the wire number (FIG. 13). The computer searches the data base to identify the hole that is to receive the contact of the selected wire, and provides a signal to the lamp controller. This signal causes the light source 38 associated with the fiber rod whose end is projecting from the identified hole to be illuminated (FIG. 14), so that this fiber can be readily discerned by the operator. In addition, the processor provides an output signal to the operator, e.g., an audible signal by way of a voice synthesizer, identifying the number of the hole. When the operator has visually located the correct hole, he provides a command DOWN to the computer, e.g. by way of the foot control, and the computer causes the valve controller to shift the cylinder control valve to its second state, thereby shifting the cylinder to its retracted condition and withdrawing the lighted fiber rod from the hole in the insert (FIG. 15). The operator inserts the contact into the hole (FIG. 16), and selects another wire for attachment to the connector (FIG. 17). This sequence of operations is repeated until all the wires have been attached to the connector.

Figure 18:
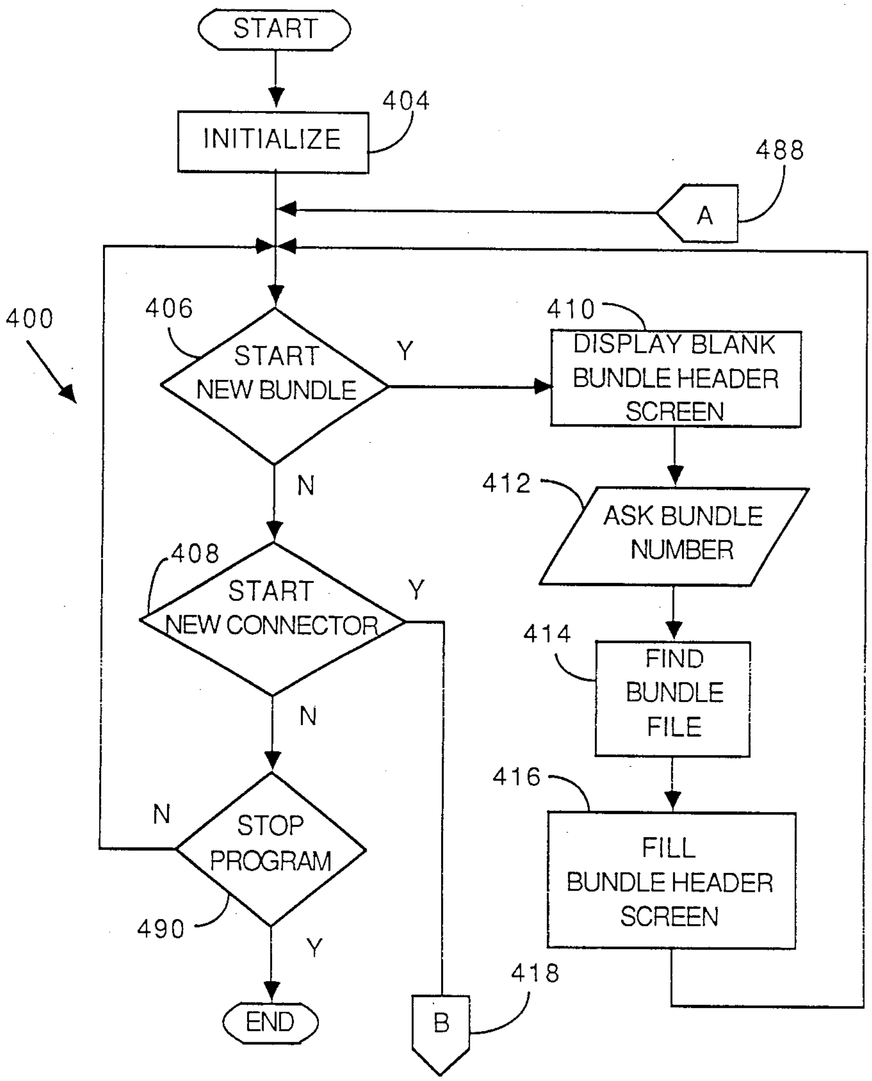

FIG. 18 is a flow diagram of the main program loop 400 and the new bundle procedure 402 for a program which is referred to hereinafter as CAMCA Computer Aided Manual Connector Assembly), for operating apparatus of the type illustrated in FIGS. 1-6. After initialization, block 404, two basic operations may be performed: the new bundle procedure, selected at start new bundle decision block 406, or a new connector operation, selected at start new connector decision block 408. The new bundle procedure 402 in FIG. 18 comprises the path beginning with the yes branch of the start new bundle decision block 406, including blocks 410-416, and returning as an input to the start new bundle decision block 406. In the new bundle procedure, a blank bundle header screen is displayed, block 410, the operator is prompted for a new bundle number, block 412, the bundle file is located, block 414, and the bundle header screen is displayed, block 416. Control returns to the main program loop 400 where the next operation to perform is a new connector operation. The new connector operation comprises the bulk of the remaining control flow.

Figure 19:
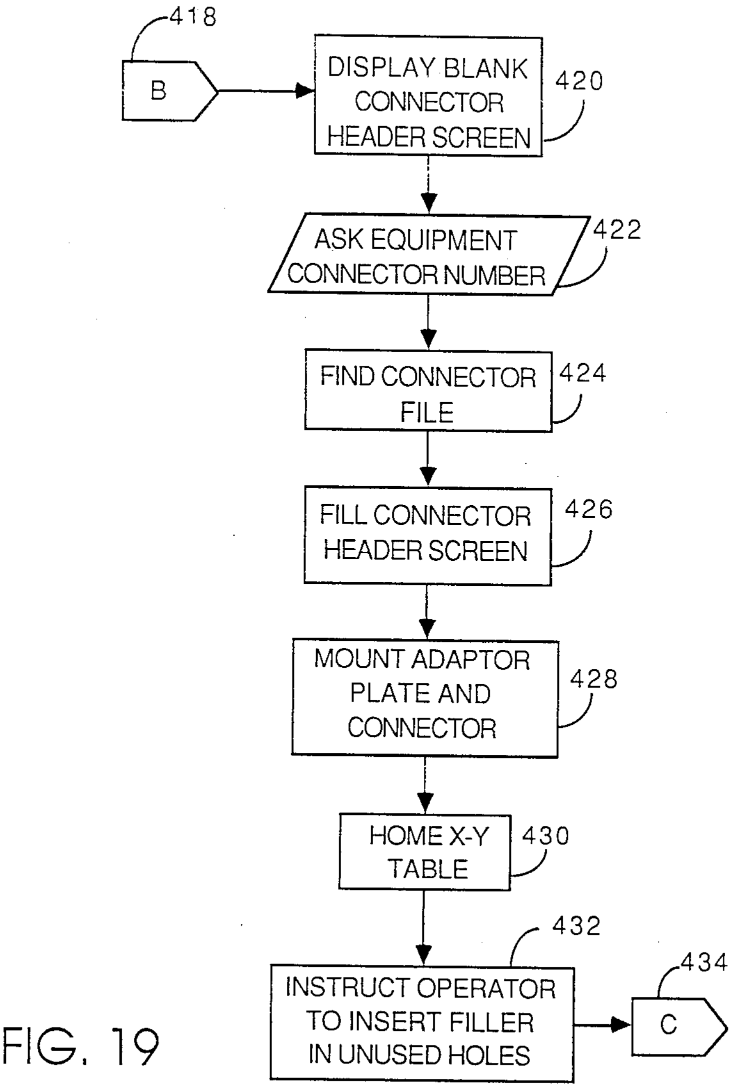
Figure 20:
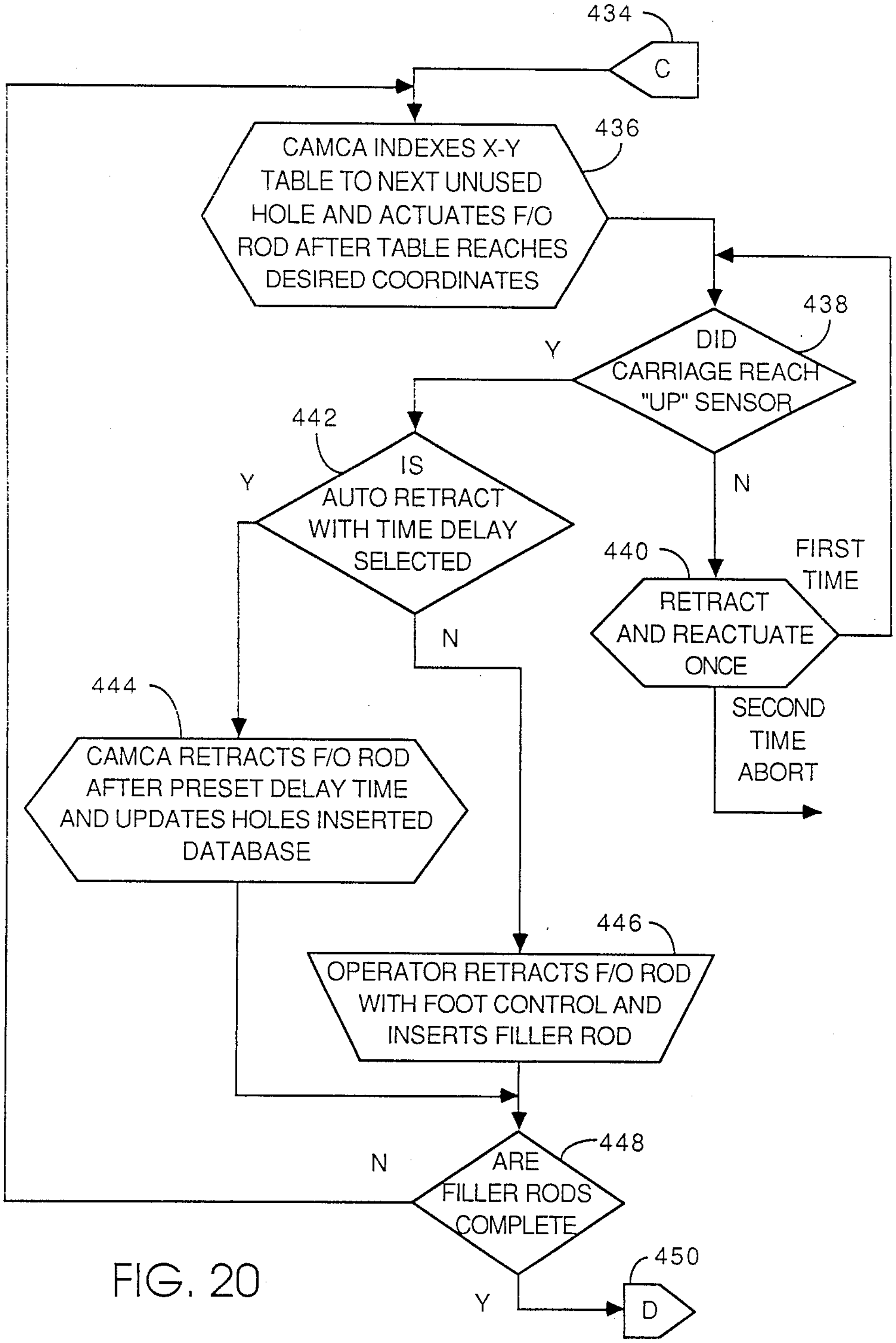

FIG. 19 depicts the initial new connector operations. A blank connector header screen is displayed, block 420, the operator is prompted for an equipment connector number, block 422, the connector data file for the current connector is located, block 424, and the current connector information is displayed on the screen, block 426. The adaptor plate and connector are mounted, block 428, the X-Y table is oriented or homed, block 430, and the operator is instructed to insert filler rods in unused holes, block 432. Filler rods are placed in the unused connector holes where no wire terminates. In the filler rod process CAMCA uses the connector file information to determine which holes are unused. The X-Y table is indexed to each unused hole, and the fiber optic rod is inserted up through the indexed unused connector hole, block 436 in FIG. 20. The carriage 116 must reach the "UP" Hall effect sensor (the sensor 104) to indicate successful insertion of the fiber optic rod in the indexed connector hole, as indicated by the branch at decision block 438. An abort procedure is invoked in block 440 in the event that the carriage twice fails to reach the "UP" sensor, as indicated via the negative branch from decision block 438. If the "UP" sensor is reached, then control passes from decision block 438 to decision block 442 to determine whether auto retract is selected. As FIG. 20 indicates, CAMCA can either automatically retract the fiber optic rod, block 444, or the operator can initiate retraction of the fiber optic rod using the foot control, block 446, depending on whether the automatic retract with time delay is selected via branch at decision block 442. The operator, seeing the fiber optic rod in the indexed connector hole, places a filler rod in the correct hole after the fiber optic rod is retracted. The filler rod process continues until CAMCA has indexed to all the unused holes in the current connector, as can be seen from decision block 448. After all the filler rods are in place, the program proceeds via offpage marker D (450) where error and exception conditions are handled before the wire connection procedure takes place.

Figure 22:
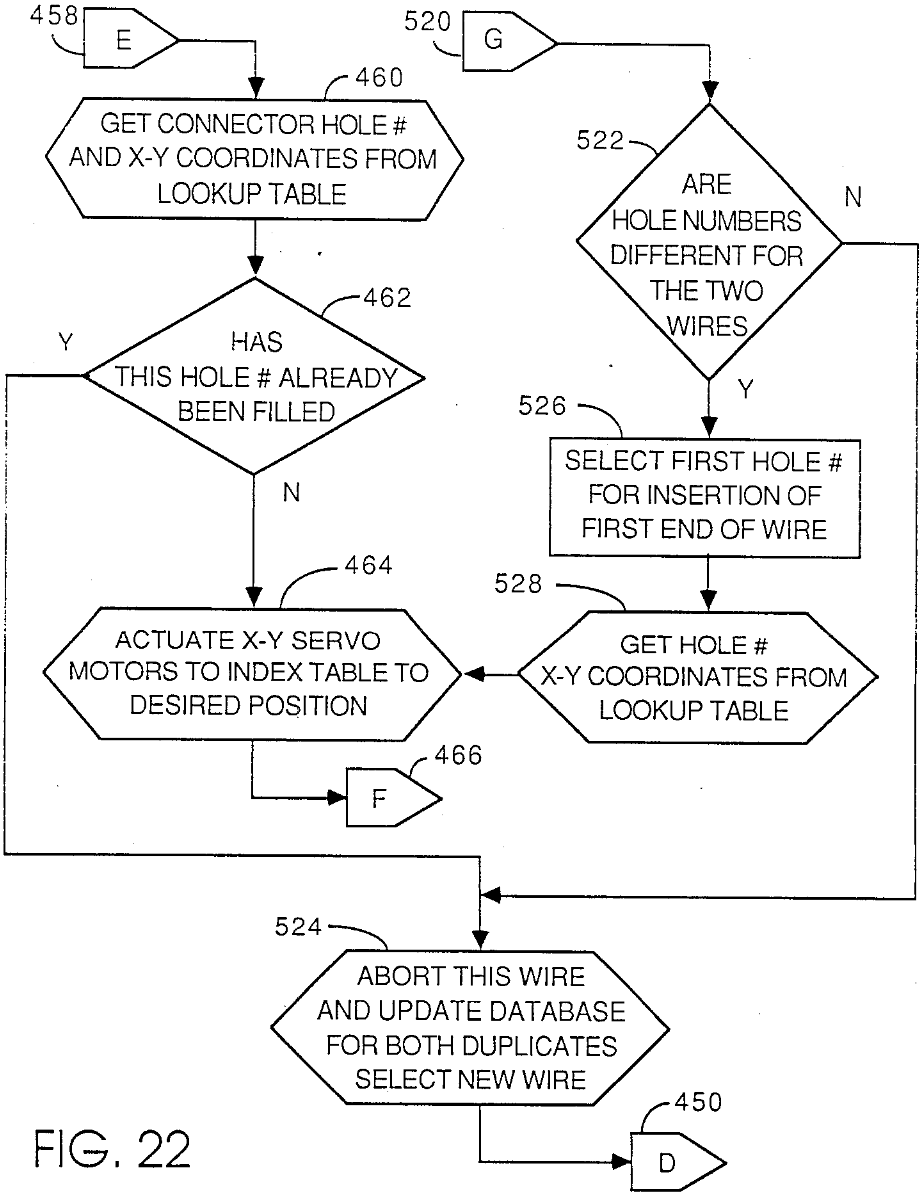
Figure 23:
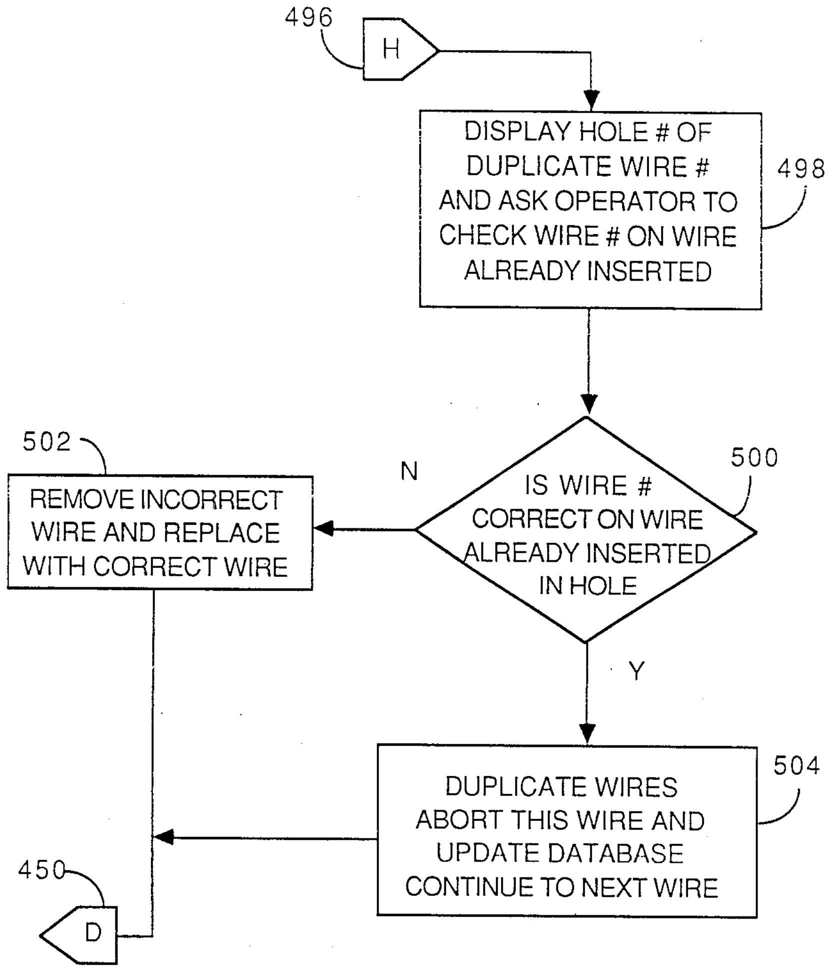

In the basic wire connection procedure, the operator selects individual wires from the current wire bundle or breakout and reads the wire number into a voice recognition system (V.R.S.), block 452. If it is a valid unprocessed wire number (block 454) and if the input does not define more than one valid unprocessed wire number (block 456) then program control passes to FIG. 22 via offpage marker E (458). Referring to FIG. 22, the connection hole number and X-Y coordinates are found in the connector data lookup table by the computer as noted by block 460. Then, if the hole has not already been filled (decision block 462) the X-Y servo motors are actuated and the X-Y table is moved to a position corresponding to the hole for the selected wire, and control passes to FIG. 24 via offpage marker F (466) wherein it is noted the operator actually inserts the selected wire in the indexed hole.

Figure 24:
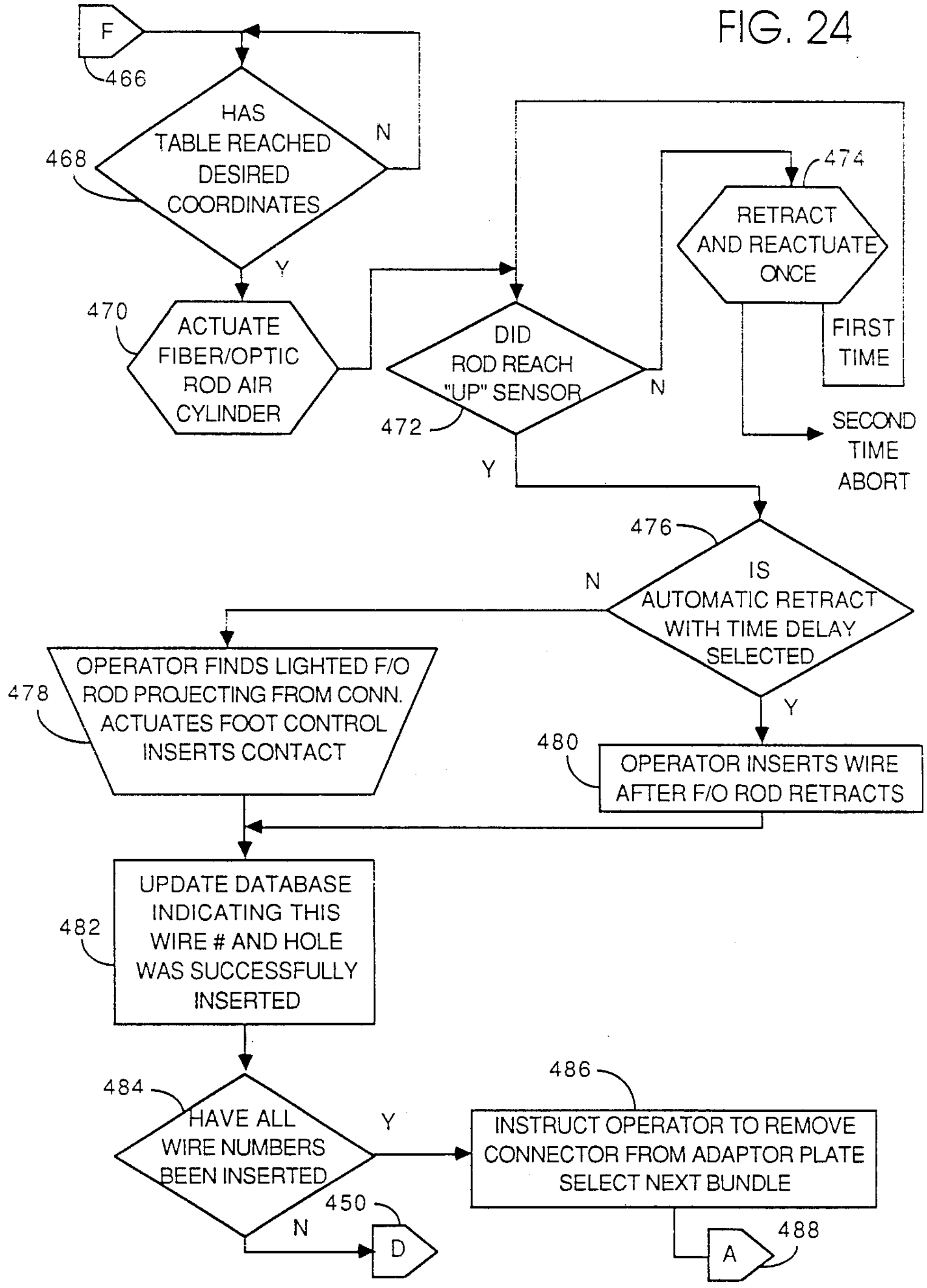

FIG. 24 depicts the wire insertion procedure. The control loops until the X-Y table reaches the desired coordinates, decision block 468, and then the fiber optic rod air cylinder 34 is actuated driving the fiber optic rod into the proper hole in the connector, block 470. The "UP" sensor indicates a successful insertion of the fiber optic rod in the indexed connector hole, with the "UP" sensor being tested in decision block 472. If the attempt to insert the fiber optic rod is unsuccessful, a second attempt is made, block 474. An abort procedure is invoked in block 474 upon a second unsuccessful attempt to insert the fiber optic rod. Once the fiber optic rod is positioned in the desired hole the procedure branches to block 476 where it is determined whether the fiber optic rod is to be retracted under operator control or automatically with time delay. In either case the operator inserts the current wire in the hole previously indicated by the fiber optic rod, block 478 or 480, and the data base is updated noting successful attachment to the connector of this wire number (block 482). Decision block 484 is now entered. If the wires have not all been inserted then there is a branch from block 484 and return is made to FIG. 21 via offpage marker D (450)

wherein the next wire is selected and read into the V.R.S.; if all the wires have been inserted in the connector then block 486 is next where the operator is instructed to remove the connector from the adaptor plate and select the next bundle. Control then returns to the main program loop, FIG. 18, via offpage marker A (488), where the program may be either terminated, in decision block 490, or a new bundle procedure invoked, in decision block 406.

Figure 21:
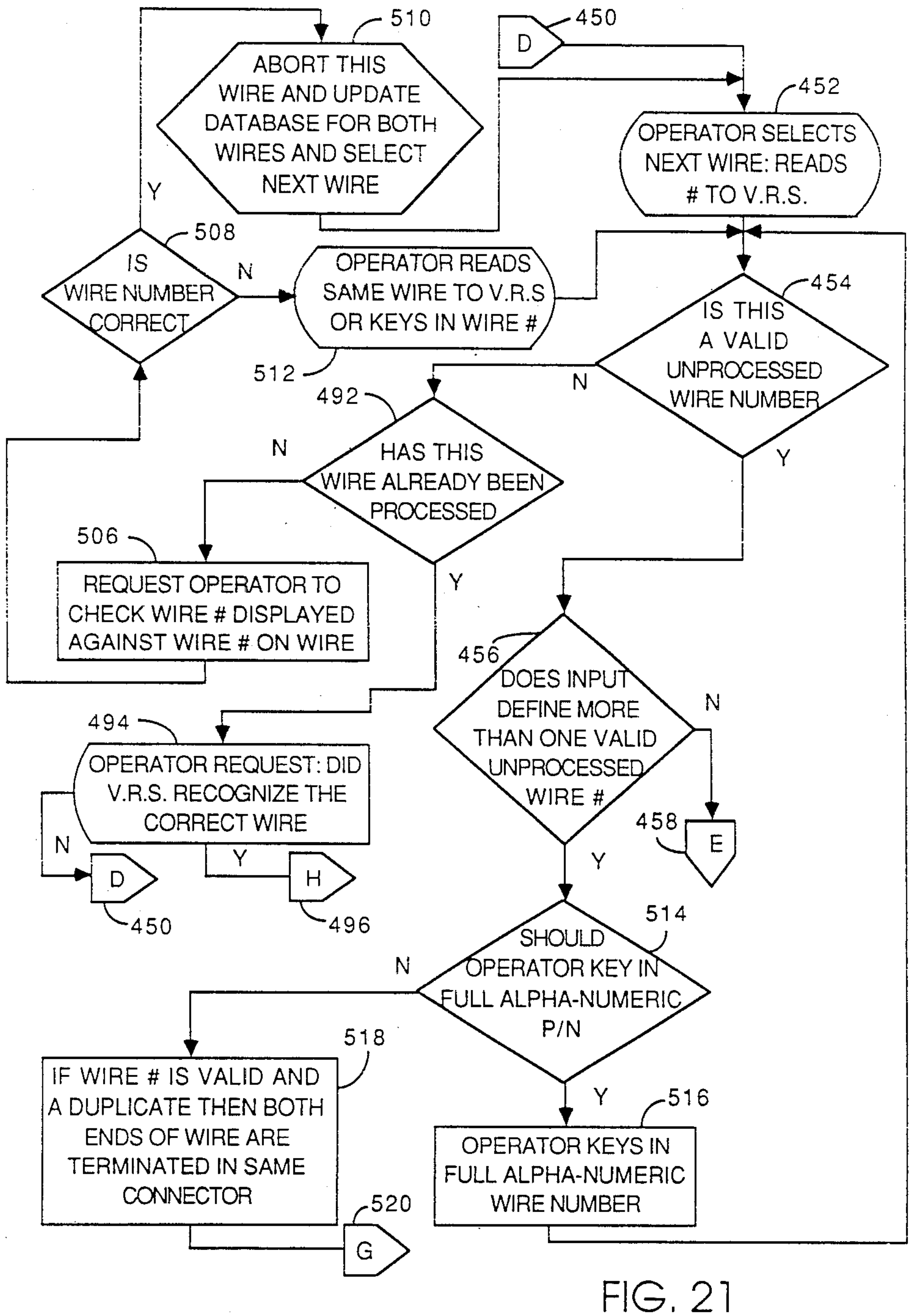

FIG. 21 also includes several exception or error paths. The first error path concerns input of a valid wire number which has already been inserted, i.e., the input is not a valid unprocessed wire number because the wire has already been processed as indicated by branch from decision block 454 to decision block 492 and then to block 494. In this case the current input is a duplicate of a previous input, and it must be determined whether the current duplicate input is correct or whether the previous input was correct; if the previous input was in error, the wire that was inserted in response to that input must be removed from the connector and replaced with the current wire. The operator has the option, at block 494, to ascertain whether the V.R.S. recognized the correct wire. If it did not, control returns to the V.R.S. input block 452 via marker D (450) and a wire is selected and read into the V.R.S. If the answer is yes then the procedure enters block 498 in FIG. 23 wherein the connector hole number of the duplicate wire is displayed and the operator is asked to check the wire number on the wire already inserted in that hole. If the wire number is not correct on the wire already inserted, then a branch is executed at decision block 500 to operator action block 502 where the incorrect wire is removed and replaced with the correct wire; if the wire number is correct on the wire already inserted, then a duplicate wire error condition exists and control branches from block 500 to block 504 where the current wire is aborted, and the data base is updated. Following the V.R.S. verification procedure, return is made to the non-error path via offpage marker D (450) and the operator selects a new wire and reads the wire number into the V.R.S.

A second error path in FIG. 21 concerns a wire number which is not a valid unprocessed wire number, decision block 454, and has not already been processed, decision block 492. In this case the program proceeds to block 506. The operator is asked to check the wire number displayed against the wire selected, with control flowing from block 506 to decision block 508. If the number is correct, a branch occurs from block 508 to block 510 where the current wire is aborted and the data base updated accordingly with return to block 452 where a new wire is selected; if the number is incorrect, then in block 512 the operator reads the number into the V.R.S. a second time with return to the non-error path at block 454.

The last error condition depicted in FIG. 21 involves a valid unprocessed wire number, branch at block 454 to block 456, which defines more than one valid unprocessed wire, branch from block 456 to decision block 514. If the operator is required to key in the full alphanumeric part number, branch from block 514 to block 516, then control returns to the non-error path at block 454 which tests to see if the keyed part number is now a valid unprocessed wire number; if the operator is not required to key in the full alphanumeric part number, branch is made from block 514 to block 518. If the wire number is a valid duplicate, then both ends of the wire may be terminated in the same connector, and control branches to FIG. 22 via offpage marker G (520).

Referring now to FIG. 22, if the hole numbers are the same for the two wires (branch from block 522 to block 524) then an error condition exists and the current wire is aborted with the data base being updated for both duplicates. The procedure returns to FIG. 21 via offpage marker D (450) and the next wire is selected; if the hole numbers are different, then ends of the wire terminate in the same connector at different holes and the operator selects one of the holes (block 522) for the first end of the wire. Then in block 528 the X-Y coordinates for that hole are found in the lookup table. In block 464 the X-Y table servo motors are actuated and move the X-Y table to the desired position. As seen via offpage marker F (466) the operator then inserts the wire in the connector.

It will be appreciated that the present invention is not restricted to the particular embodiments that have been described, and that variations may be made therein without departing from the scope of the invention as defined in the appended claims and equivalents thereof.

We claim:

1. A method for assembling multiple rod-form elements into a support member provided with multiple apertures for receiving said elements, comprising:
   - identifying a given rod-form element and in response thereto ascertaining the location of the aperture wherein the given rod-form element is to be inserted;
   - extending a guide member into the thus ascertained aperture so as to enable the aperture to be discerned;
   - withdrawing the guide member; and
   - inserting the given rod-form element into the aperture from which the guide member was withdrawn.

2. A method for assembling multiple conductors into a connector, wherein said connector is provided with multiple apertures for receiving said conductors, said method comprising:
   - identifying a given conductor and in response thereto ascertaining via electronic data lookup means the location of an aperture wherein said given conductor is to be inserted;
   - extending an illuminated rod into the last mentioned aperture in response to data lookup so that said aperture is easily recognizable by an operator; and
   - inserting said given conductor in the last mentioned aperture.

3. Apparatus for use in assembling multiple conductors into a connector wherein said connector is provided with apertures for receiving said conductors, said apparatus comprising:
   - control means responsive to identification of a given conductor for indicating the aperture in said connector wherein said given conductor is to be inserted;
   - insertable rod means extendable into said apertures; and
   - movable means carrying said rod means and responsive to an indication that said given conductor is to be inserted in a particular aperture for moving said rod means to said last mentioned aperture and extending the rod means into such aperture.

4. Apparatus for use in assembling the ends of multiple rod-form elements into a predetermined array, comprising:

connector means defining a plurality of apertures for receiving the ends of the rod-form elements respectively;

control means responsive to identification of a given rod-form element for indicating the aperture in the connector means wherein the given rod-form element is to be inserted; and means responsive to said control means for positioning extendable means into the aperture indicated by the control means and subsequently withdrawing the extendable means from that aperture.

5. Apparatus for use in assembling multiple conductors into a connector, wherein said connector is provided with apertures for receiving said conductors, said apparatus comprising:

first support means for receiving said connector;

control means responsive to identification of a given conductor for indicating the aperture in said connector wherein said given conductor is to be inserted; and selectively illuminated extendable means positionable into at least one of said apertures in said connector and operable in response to said indication of the aperture wherein said given conductor is to be inserted for identifying the last mentioned aperture.

6. The apparatus according to claim 5 including means for causing said extendable means to move longitudinally through a said aperture in response to said indication that said given conductor is to be inserted therein.

7. The apparatus according to claim 6 including means illuminating said extendable means substantially simultaneously with longitudinal movement thereof.

8. The apparatus according to claim 5 including means for positioning plural extendable means through said apertures and withdrawing a said extendable means from an aperture in response to said indication that said given conductor is to be inserted in the last mentioned aperture.

9. The apparatus according to claim 8 including means illuminating the extendable means to be withdrawn.

10. The apparatus according to claim 5 wherein said control means comprises a processor supplied with voice recognition means for receiving said identification of a conductor.

11. Apparatus for use in assembling multiple conductors into a connector adapted for coupling with a mating connection device, wherein said connector is provided with multiple elongate apertures extending longitudinally therethrough for receiving said conductors, said apparatus comprising:

first support means for receiving said connector with an orientation facilitating manual insertion of conductors from a first side of said connector;

a fiber optic rod extendable generally toward a second side of said connector, said fiber optic rod being provided with illuminating means;

translating means for bringing about relative movement between said fiber optic rod and said connector, said relative movement being generally transverse to the axis of said connector;

control means responsive to identification of a given conductor, as well as to stored data identifying the aperture in said connector wherein said given conductor should be inserted, for operating said translating means to align said fiber optic rod with the last mentioned aperture; and means for imparting longitudinal movement to said fiber optic rod for inserting said rod through said last mentioned aperture to a location proximate the first side of said connector, facilitating recognition of such aperture and the manual insertion therein of said given conductor.

12. The apparatus according to claim 11 wherein said translating means is provided with guide means receiving said fiber optic rod and extendable with said fiber optic rod toward said second side of said connector, further including biasing means yieldably positioning said guide means for travel with said fiber optic rod until said guide means encounters said second side of said connector whereupon said guide means remains in fixed position while said fiber optic rod proceeds through an aperture in said connector.

13. The apparatus according to claim 11 wherein control means comprises a processor supplied with voice recognition means for receiving said identification of a conductor.

14. The apparatus according to claim 11 wherein said control means comprises a processor and wherein said translating means comprises an X-Y table operated by said processor and carrying said extendable fiber optic rod.

15. The apparatus according to claim 11 wherein said means for imparting longitudinal movement to said fiber optic rod includes an air cylinder responsive in operation to said processor for inserting and removing said fiber optic rod relative to an aperture in said connector.

16. The apparatus according to claim 15 further including a foot switch for initiating withdrawal of said fiber optic rod from an aperture in said connector.

17. The apparatus according to claim 15 wherein withdrawal of said fiber optic rod from an aperture is timed relative to insertion thereof.

18. The apparatus according to claim 11 wherein said support means is provided with a plurality of alternatively selectable adaptor plates for receiving, types of connectors.

* * * * *

UNITED STATES PATENT AND TRADEMARK OFFICE

CERTIFICATE OF CORRECTION

PATENT NO. : 4,727,637

DATED : March 1, 1988

INVENTOR(S) : Richard J. Buckwitz et al.

It is certified that error appears in the above-identified patent and that said Letters Patent is hereby corrected as shown below:

Column 9, line 37, an opening parenthesis should be inserted before "Computer".

Column 14, line 31, before "control" insert --said--.

Column 14, line 53, remove the comma (,) after "receiving".

Signed and Sealed this

Twenty-eighth Day of July, 1992

*Attest:*

DOUGLAS B. COMER

*Attesting Officer*

*Acting Commissioner of Patents and Trademarks*